United States Patent

Swain

[15] 3,672,603

[45] June 27, 1972

[54] TAPE CARTRIDGE

[72] Inventor: William W. Swain, Mountain View, Calif.

[73] Assignee: Cartridge Television, Inc., New York, N.Y.

[22] Filed: June 26, 1970

[21] Appl. No.: 50,125

[52] U.S. Cl. ..............................242/194, 242/198, 274/4 C, 352/156

[51] Int. Cl...................G03b 1/04, G11b 15/32, G11b 23/04

[58] Field of Search .........................242/194, 193, 197–200; 274/4 B, 4 C, 11 B, 11 C; 352/72–78, 156–158

[56] References Cited

UNITED STATES PATENTS

| | | | |
|---|---|---|---|
| 2,941,741 | 6/1960 | Bilsback | 242/199 |
| 3,078,464 | 2/1963 | Lyon et al. | 242/194 |
| 3,367,592 | 2/1968 | Smith | 242/194 |
| 3,195,826 | 7/1965 | Smith | 242/194 X |
| 3,227,387 | 1/1966 | Laa et al. | 242/198 |

FOREIGN PATENTS OR APPLICATIONS

| | | | |
|---|---|---|---|
| 1,537,240 | 10/1969 | Germany | 178/36 |

OTHER PUBLICATIONS

IBM Bulletin Vol. 9, No. 8 pp. 968 Jan. 1967 " Automatic Tape Threading."

IBM Bulletin Vol. 9, No. 11 pp. 1617 April, 1967 " Tape Cartridge."

*Primary Examiner*—Leonard D. Christian

*Attorney*—Townsend & Townsend

[57] ABSTRACT

An improved tape cartridge for use with a tape transport of the type having a rotary head assembly. The cartridge is of the reel-over-reel type and a flexible, magnetic tape coupled to the reels of the cartridge can be drawn outwardly thereof and along a portion of a rotary head assembly by tape guide or pick-up means receivable within recesses near an open extremity of the cartridge. The cartridge housing has a pivotally mounted closure near the open extremity to cover the tape and releasable latch means on the closure holds the latter coupled to the cartridge housing until it is moved into an operative position. A releasable brake in the cartridge housing holds the reels against movement until the cartridge is moved into said operative position.

27 Claims, 15 Drawing Figures

WILLIAM W. SWAIN

INVENTOR.

BY

Townsend and Townsend

WILLIAM W. SWAIN
INVENTOR.

BY

Townsend and Townsend

WILLIAM W. SWAIN

INVENTOR.

BY

Townsend and Townsend

WILLIAM W. SWAIN
INVENTOR.
BY
Townsend and Townsend

TAPE CARTRIDGE

This invention relates to improvements in tape cartridges and, more particularly, to a cartridge for use with a tape transport having a rotary head assembly.

A tape transport system for recording and playback of video signals will have a desirably high head-to-tape speed if it utilizes a rotary head assembly which permits a magnetic tape associated with the system to move past at least a portion of the assembly in a manner such that the heads of the assembly scan the tape along relatively long tracks which are oblique to it longitudinal axis. Such geometry allows an entire field of a video image frame to be recorded on each track to minimize head switching problems and to permit the use of the skip-field technique for recording and playing back video signals. With the use of the latter technique, tape can be conserved since only selected fields of a number of successive video image frames are recorded and, during playback, each recorded field is played back several times in succession at a rate fast enough to provide a video picture of acceptable quality. Thus, tape length requirements are significantly reduced.

Video tape recording and playback units are the basis for a future consumer market which is estimated to be comparable to or greater than the consumer market now being enjoyed by color television receivers. The cost of video recording and playback units will eventually be low enough so that consumers who now have the buying power to purchase a color television receiver will have the buying power to purchase a video recording and playback unit. It is desirable, therefore, that such a unit be as inexpensively priced as possible while, at the same time, providing all of the advantages, such as a rotary head assembly and the use of the skip-field technique, to assure an efficiently operating system with a long, useful operating life.

One of the factors in achieving the foregoing aims is to supply the tape for such a unit in a cartridge which is interchangeable with video recorder and playback units and which remains trouble-free after many uses even by persons having little or no experience in operating such recorder and playback units. Moreover, placing the tape in cartridges allows the consumer to purchase, record and store a large amount of video information in much the same manner as audio information is purchased, recorded and stored on discs and audio tapes. A library of video tape cartridges can be amassed which will include both prerecorded tapes and tapes recorded by the consumer using his own video recording and playback unit.

In view of the foregoing, it is desirable that a tape cartridge be provided which can meet the requirements for use by consumers with home video tape recording and playback units wherein the cartridge will have a long operating life notwithstanding the fact that the cartridge might well be roughly handled and may be used on different recording and playback units. The present invention is directed to a tape cartridge suitable for meeting the aforesaid requirements. To this end, the tape cartridge of this invention is of a simple and rugged construction, can be efficiently used with a tape transport system having a rotary head assembly, and can be made in a size and shape to facilitate storage of a relatively large number of such cartridges in a minimum of space. It is also constructed to permit a stretch of the tape carried thereby to be readily shifted away from an open extremity of the cartridge by tape guide means actuated in response to a command signal so that the placement of the tape need not be done manually but is done automatically by the recording and playback unit itself to further limit the need for operator attention.

The cartridge is of the reel-over-reel type to minimize its size and to render it substantially compact. Also, the reels are free of any attachment to the cartridge housing or to each other to eliminate the need for reel support structure in the housing itself. The hubs of the reels are constructed so that the reels can be quickly and easily coupled to respective drive spindles of a tape transport as the cartridge is moved relative to and toward a fixed, operative position on the tape transport near the rotary head assembly thereof.

The cartridge has a pivotal closure for its open extremity and the closure has latch means for releasably connecting the same to the cartridge housing to protect the tape stretch adjacent thereto when the cartridge is out of an operative position. The latch means automatically releases the closure when the cartridge moves into its operative position; thus, the cover cannot be accidentally opened and the tape will remain protected when the cartridge is not in use.

Another important feature of the cartridge is the improved brake unit within the cartridge housing for holding the reels against any appreciable movement therewithin. The brake unit is constructed to engage the flanges of the tape reels so long as the cartridge is not in an operative position and to become disengaged from the reel flanges as the cartridge is moved into its operative position.

Other features of the invention include the tape indicator arm which indicates the amount of tape left to be used during a record or playback operation, the web structure for supporting the tape stretch near the open extremity of the cartridge housing, and the two-piece construction of the housing itself which permits it to be molded from a suitable thermoplastic material. Such construction also facilitates the assembly of the cartridge and renders it lightweight while permitting the cartridge to be made in standard sizes.

The primary object of this invention, therefore, is to provide a tape cartridge of the reel-over-reel type adapted for use with a tape transport having a rotary head assembly wherein the cartridge can be used many times and can be subjected to rough handling while remaining substantially trouble-free and being interchangeably usable with different tape transports.

Another object of this invention is to provide an improved tape cartridge for use with a video recording and playback unit wherein the cartridge has a pivotally mounted closure for protecting a stretch of tape to be drawn out of the cartridge with the closure being constructed so that it can be automatically opened and closed as the cartridge moves into and out of an operative position to thereby avoid having to handle the cartridge to open and close the same.

A further object of this invention is to provide a cartridge of the type described wherein the cartridge is of the reel-over-reel type and has an improved brake unit which releasably holds the reels against any substantial movement in the housing until the cartridge is moved into an operative position permitting the reels to move onto respective drive spindles and to be rotated thereby.

Other objects of this invention will become apparent as the following specification progresses, reference being had to the accompanying drawings for an illustration of an embodiment of the cartridge.

Figure 3:
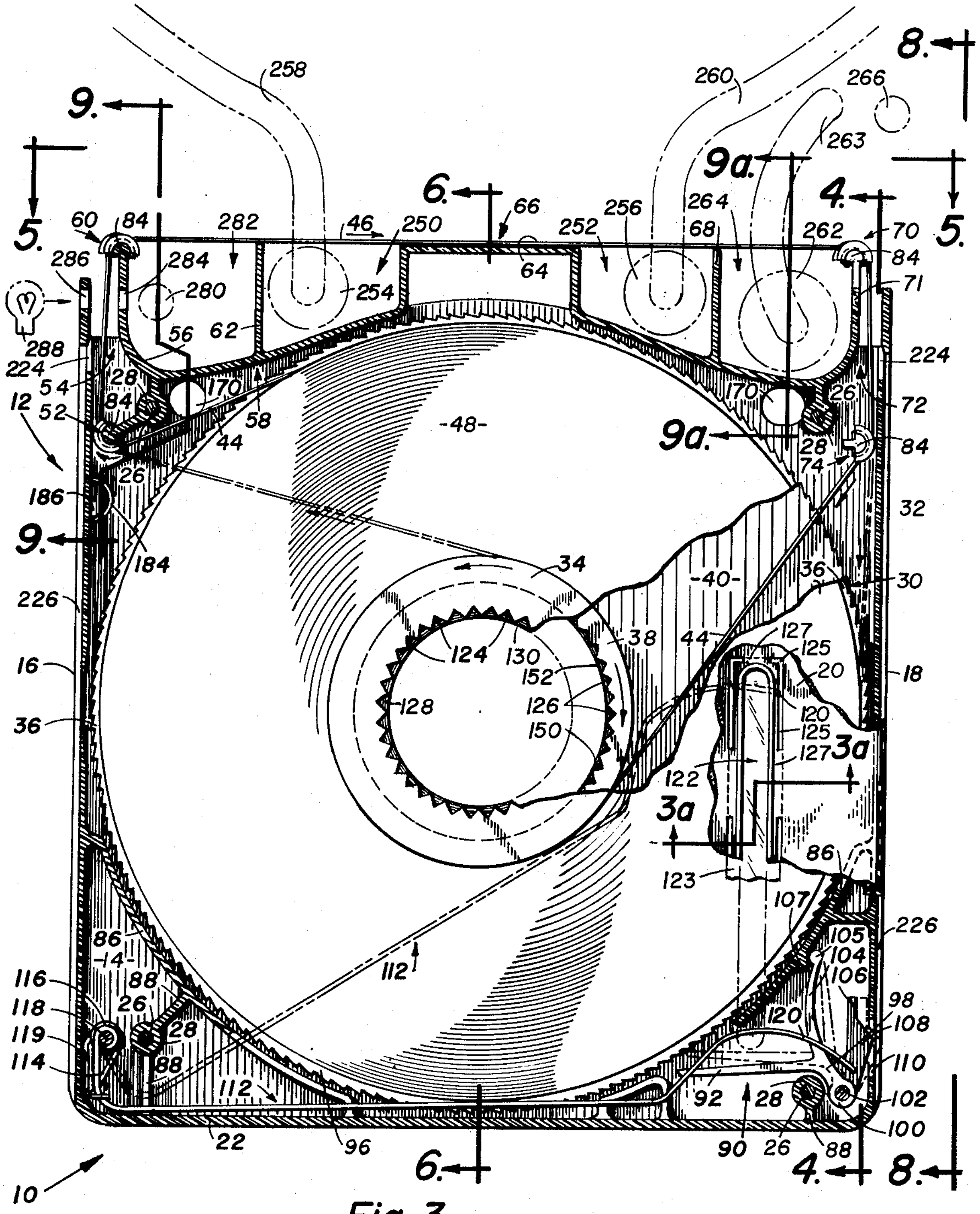
FIG. 3 is an elevational view of the cartridge, showing the interior thereof with the back wall removed.
Figures 4, 4A, 6:
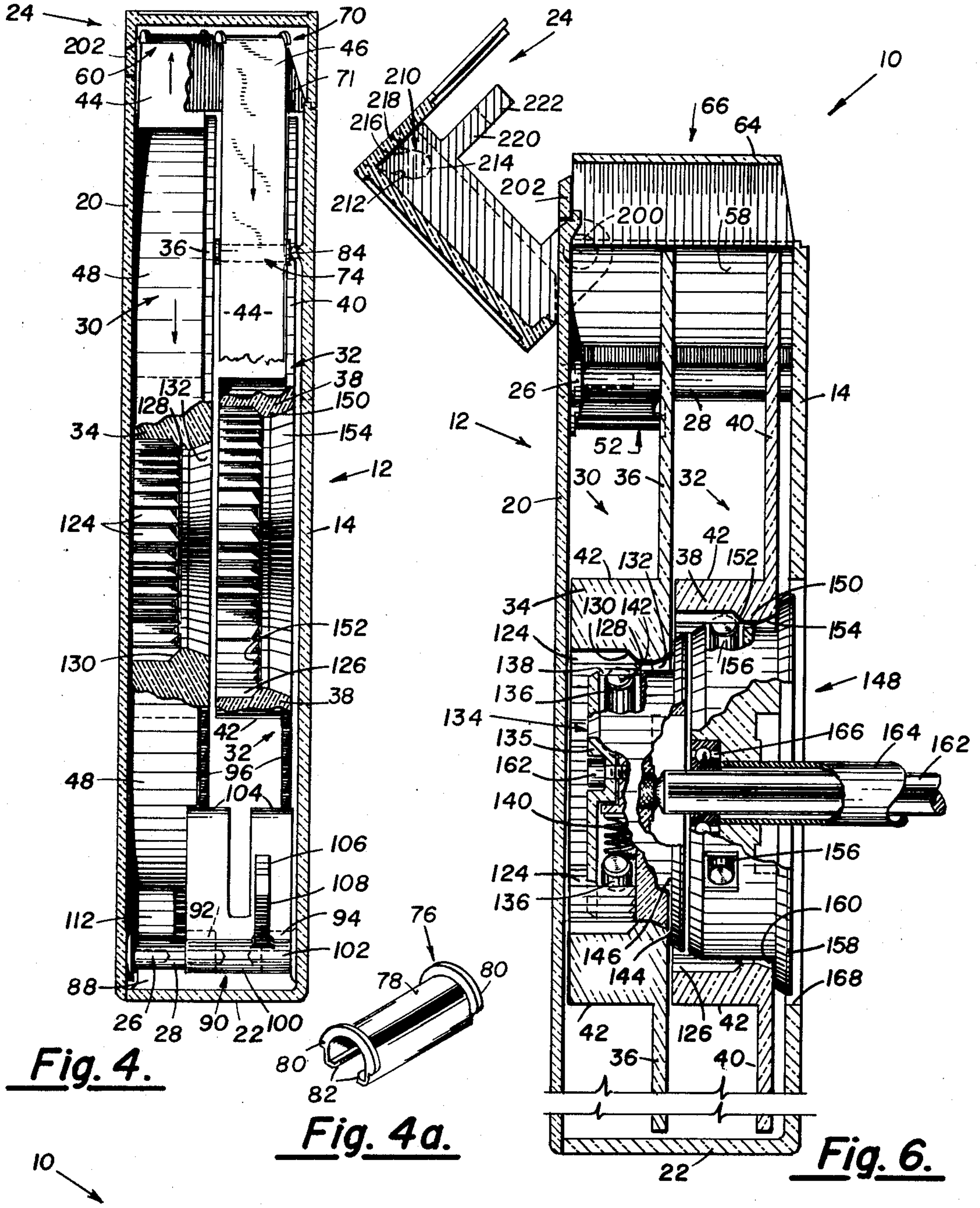
FIG. 4 is a vertical section through the cartridge, as taken along line 4—4 of FIG. 3, with the top closure in a closed position.
Figure 5:
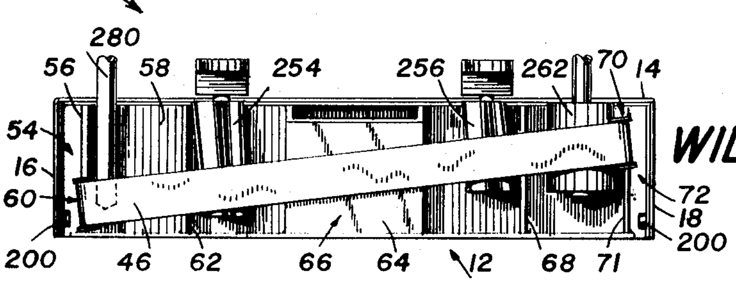
Figure 7:
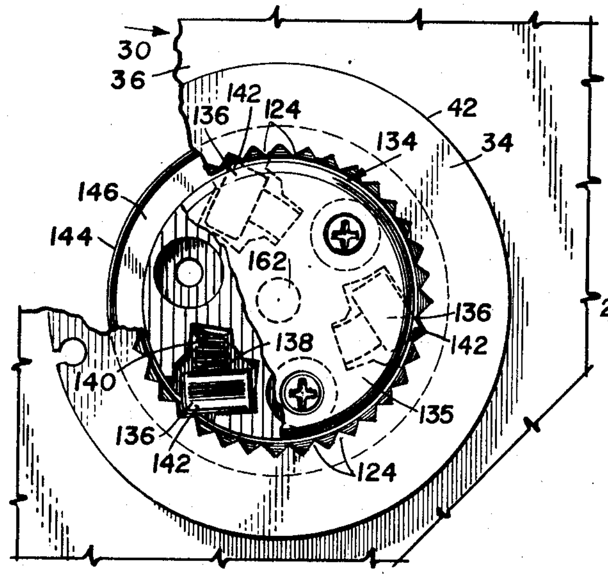
Figure 8A:
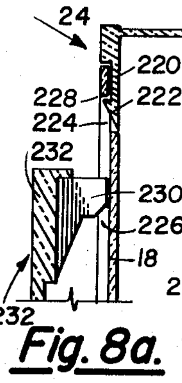
Figure 8B:
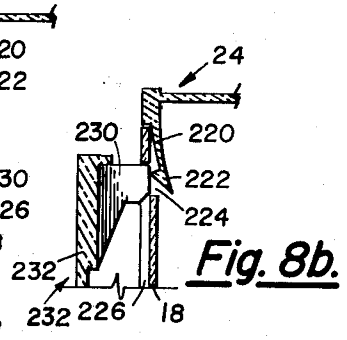
Figure 9A:
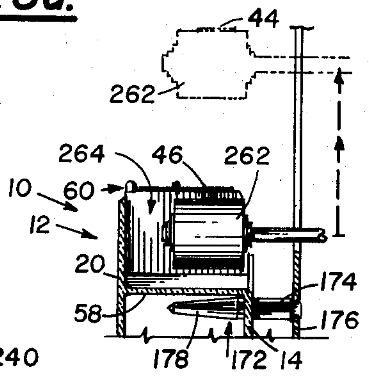
Figures 8, 8C, 9:
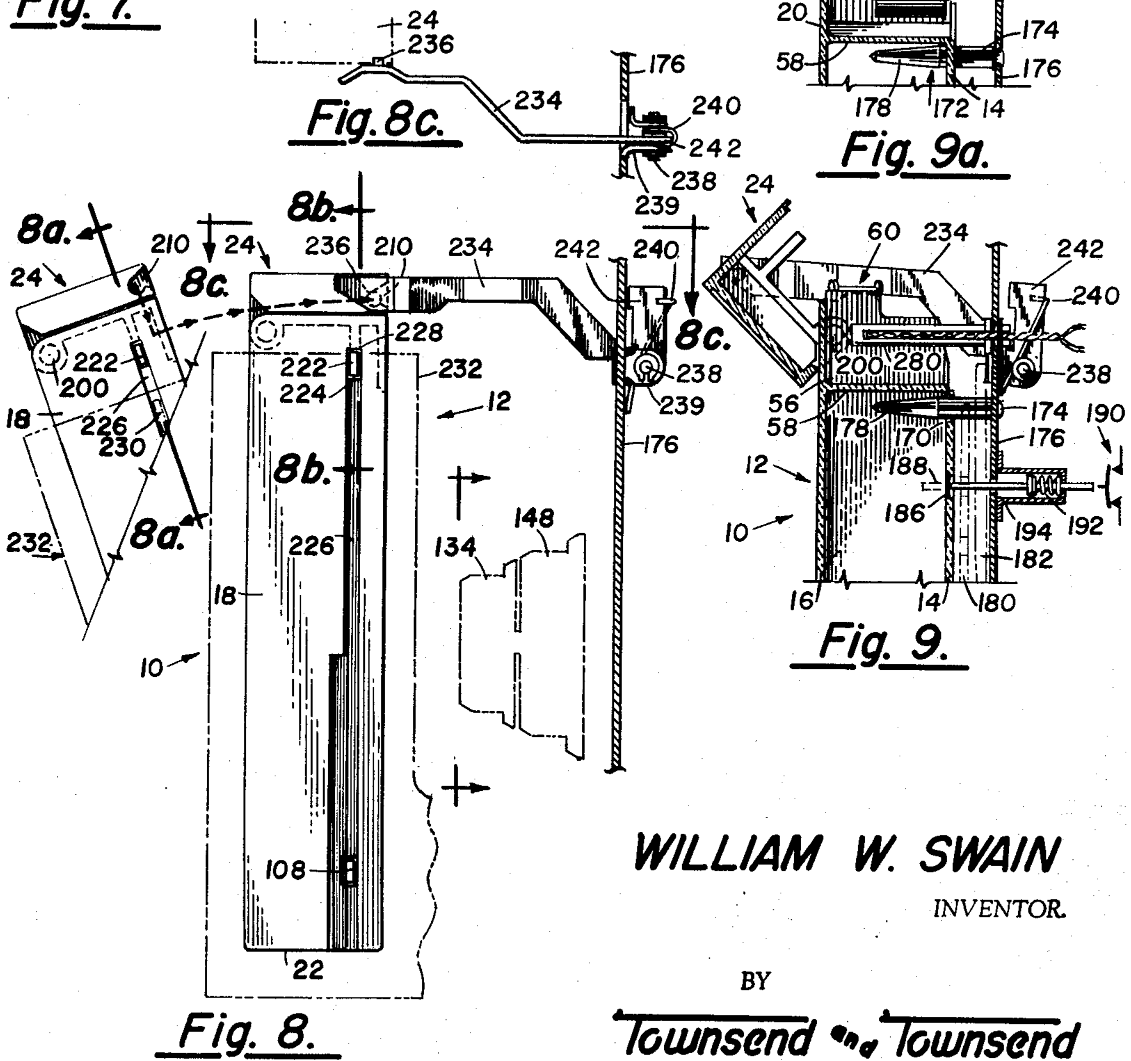

FIG. 4*a* is a perspective view of one of the tape guides of the cartridge;

FIG. 5 is a reduced size top plan view of the cartridge, as taken on line 5—5 of FIG. 3;

FIG. 6 is a vertical section through the cartridge taken along line 6—6 of FIG. 3 and showing the way in which the reels thereof are coupled to a pair of spindles forming parts of a tape transport;

FIG. 7 is a fragmentary, elevational view of a reel hub coupled to its spindle;

FIG. 8 is a reduced size side elevational view of the cartridge looking in the direction of line 8—8 of FIG. 3, showing it mounted in a carriage mechanism for movement toward a tape transport;

FIG. 8a is a fragmentary, cross-sectional view taken along line 8a—8a of FIG. 8;

FIG. 8b is a fragmentary, cross-sectional view taken along line 8b—8b of FIG. 8;

FIG. 8c is a fragmentary, top plan view of the arm for opening the top closure of the cartridge as the latter is moved toward the tape transport;

FIG. 9 is a fragmentary, cross-sectional view of the cartridge taken along line 9—9 of FIG. 3, showing the operative position thereof adjacent to a tape transport with the top closure in a full open position; and FIG. 9a is a cross-sectional view taken along line 9a—9a of FIG. 3.

The tape cartridge which is the subject of this invention is broadly denoted by the numeral 10 (FIGS. 1 and 2) and includes a housing 12 provided with a front wall 14, a pair of sidewalls 16 and 18, a back wall 20, a bottom wall 22 (FIG. 6), and a hinged closure or top 24 pivotally secured to sidewalls 16 and 18. Housing 12 is preferably of a two-piece construction. To this end, front wall 14, sidewalls 16 and 18, and bottom wall 22 are integral with each other to form a one-piece unit. Back wall 20 is releasably secured to this unit by attachment screws 26 which extend through holes in back wall 20 and are threaded into tubular projections 28 (FIG. 3) which are integral with the inner surface of front wall 14. The unit formed by the front, side and bottom walls is preferably molded from a suitable platic material. Also, back wall 20 can be molded from plastic. As hereinafter described, a number of webs and other projections are molded with the housing unit comprised of the front, side and bottom walls. This simplifies the formation of the unit and reduces its production costs.

Cartridge 10 (FIG. 6) has a pair of tape reels 30 and 32 therewithin, the reels being unsupported in the cartridge in the sense that they can "float" or move about randomly to a limited extent with respect to each other and with respect to housing 12. The reels are generally axially aligned with each other so that cartridge 10 is of the reel-over-reel type. The reels are allowed to be loose because, when the cartridge is in an operative position on a tape transport of the type having a rotary head assembly, the reels will be securely attached to respective spindles of the tape transport and it is the spindles that will support the reels and determine their operative positions with respect to the rotary head assembly of the tape transport. In their operative positions, the reels will be truly co-axial with each other and will be spaced inwardly from the inner surfaces of housing 12 so as to be free to rotate with their spindles without interfering with each other and without interference with any part of the cartridge housing itself.

Reel 30 (FIGS. 4 and 6) is provided with a hub 34 and a flange 36 which extends radially outwardly from hub 34. Similarly, reel 32 is provided with a hub 38 and a flange 40. Reel 30 defines the tape supply means for the cartridge and reel 32 provides the tape take-up means therefor. Each of the hubs has a circular outer face 42 about which a flexible, magnetic tape 44 is to be wrapped, the adjacent flange providing the lateral support for the tape pack formed on the corresponding hub. The tape pack on supply reel 30 is denoted by the numeral 48 and is shown in FIG. 4 before tape is moved onto reel 32.

Tape 44 (FIGS. 3 and 5) is coupled in any suitable manner to hubs 34 and 38 and has a tape stretch 46 extending between the reels. Preferably, each end of the tape has a transparent leader whose outer end is connected to a respective hub. The transparency of the leaders allows them to be optically sensed as the tape moves between the reels.

The path along which the tape traverses as it moves between the reels is shown in FIGS. 3 and 5 wherein the tape moves off hub 34 of reel 30, past a first tape guide 52, upwardly through an opening 54 between sidewall 16 and the adjacent web segment 56 of a web broadly denoted by the numeral 58. The tape then passes over a second guide 60 (FIGS. 1 and 3), over another web segment 62 (FIG. 1), across the flat surface 64 of a hollow extension 66 integral with web 58, across a third web segment 68 and over a third tape guide 70. The tape then passes back into the cartridge through an opening 72 (FIGS. 3 and 4), past a fourth tape guide 74 and then onto hub 38 of the take-up reel 32. For purposes of illustration, FIG. 3 shows the tape in full lines as it appears on the supply reel 30 at the beginning of a record or playback operation when the maximum amount of tape is on the supply reel. FIG. 3 also shows in dashed lines the position of the tape on the supply reel when the take-up reel has the maximum amount of tape, i.e., corresponding to the end of a record or playback condition. Tape reel 30 and hub 34 rotate in a counterclockwise sense and tape reel 32 rotates in a clockwise sense during a record or playback operation. Conversely, tape reel 30 rotates in a clockwise sense and tape reel 32 rotates in a counterclockwise sense during a rewind operation.

Web 58 is integral with the uppermost, arcuate extremity of front wall 14 and projects laterally therefrom; hence, the web can be molded with the housing unit comprised of the front, side and bottom walls. Web segments 56, 62, 68 and 71 and hollow extension 66 all form parts of web 58.

Each of the tape guides 52, 60, 70 and 74 includes a flanged, metallic bearing 76 of the type shown in FIG. 4a wherein a semi-cylindrical surface 78 is bounded at the opposed ends by a pair of flanges 80. The bearing has a pair of inwardly extending projections 82 spanning the distance between flanges 80 and these projections snap around the adjacent flat surfaces of a respective boss 84 integral with such as the one web 58 in the manner shown in FIG. 3. The various bosses 84 are at least as long as and are complementally received within respective bearings 76. Bosses 84 of tape guides 52 and 74 are integral with the inner surface of front wall 14; whereas, bosses 84 of tape guides 60 and 70 are integral with portions of the outermost extremities of web segments 56 and 71. Moreover, the last mentioned pair of bosses 84 are generally parallel with each other but are canted with respect to the planes of their respective web segments 56 and 71, whereby tape stretch 46 supported by guides 60 and 70 will extend diagonally across the open extremity of the cartridge housing as shown in FIG. 5. Also, tape stretch 46 is supported by and movable over the upper end faces of web segments 62 and 68 and the upper flat face 64 of hollow extension 66.

A pair of arcuate webs 86 (FIG. 3) are formed with the front, side and bottom walls of housing 12 and cooperate with web 58 to strengthen these walls while permitting rotation of reels 30 and 32 within the cartridge housing. The right-hand web 86 does not extend to rear wall 20 so as to accommodate a tape indicator arm to be described. Web segments 88 interconnect the adjacent tubular projections 28 to bottom wall 22 and to the adjacent arcuate web 86 to strengthen the projections. Similar web segments extend to the upper projections 28 and to bosses 84 of tape guides 52 and 74 to strengthen the same, as shown in FIG. 3.

Brake means in housing 12 operates to releasably hold the reels against movement when the cartridge is out of an operative position with respect to a tape transport. To this end, a brake unit 90 is pivotally mounted within the housing and has a pair of generally parallel, finger-like extensions 92 and 94 (FIGS. 3 and 4) of substantially equal length which releasably engage corresponding, spaced teeth 96 on the outer peripheries of respective flanges 36 and 40. Extensions 92 and 94 are integral with a second extension 98 having a sleeve 100 at one end thereof, the sleeve being pivotally mounted on a pin 102 integral with front wall 14 and disposed adjacent to the junction of sidewall 18 and bottom wall 22 (FIG. 3). Extensions 92 and 94 are essentially independent of each other in the sense that they are spaced apart as shown in FIG. 4. A spring 104 integral with extension 98 projects outwardly therefrom at an angle with respect to extensions 92 and 94. Spring 104 has a rib 105 on its outer end which engages a boss 107 integral with the adjacent arcuate web 86. Thus, boss 107 serves as an abutment against which spring 104 engages, allowing the spring to flex in the manner shown in full lines in FIG. 3 when sleeve 100 is rotated in a counterclockwise sense. Thus, extensions 92 and 94 can then move downwardly and out of engagement with teeth 96 on flanges 36 and 40, thereby releasing the reels for rotation within the housing.

To cause movement of extensions 92 and 94 into the full line positions of FIG. 3, an arm 106 is provided, the arm being integral with sleeve 100 and extending upwardly therefrom. Arm 106 has a lateral projection 108 which normally projects through an opening 110 in sidewall 18. This projection is above pin 102 so that, when a lateral force is exerted on the projection, arm 106 is forced in a counterclockwise sense about pin 102 when viewing FIG. 3. This movement is against the bias force of spring 104 which flexes from the dashed line position to the full line position to, in turn, allow movement of extensions 92 and 94 with sleeve 100 from the dashed line position to the full line position of FIG. 3, thereby out of coupled relationship with the teeth on the reel flanges.

Projection 108 is adapted to be forced inwardly of the housing when the cartridge is moved into an operative position within a carriage mechanism which is adapted to move the cartridge toward a tape transport. So long as the cartridge remains in the operative position in the carriage mechanism, projection 108 will be held inwardly and extensions 92 and 94 will be held out of coupled relationship with the reel flanges. Removing the cartridge from the carriage mechanism causes the projection to spring out through opening 110 as shown by the dashed line of FIG. 3.

A tape indicator arm 112 is provided to indicate the amount of tape left on supply reel 30 or the playing time remaining during a record or playback operation. This arm, shown in FIG. 3, has a lateral extension 114 at one end thereof. A sleeve 116 on extension 114 is pivotally mounted on a pin 118 integral with front wall 14 near the junction between sidewall 16 and bottom wall 22. A coil spring 119 surrounding pin 118 is coupled with extension 114 and biases arm 112 in a counterclockwise sense when viewing FIG. 3; thus, arm 112 is held in engagement with the tape and follows the decrease of diameter of the tape pack as the tape is fed off the supply reel and onto the take-up reel.

Figure 2:
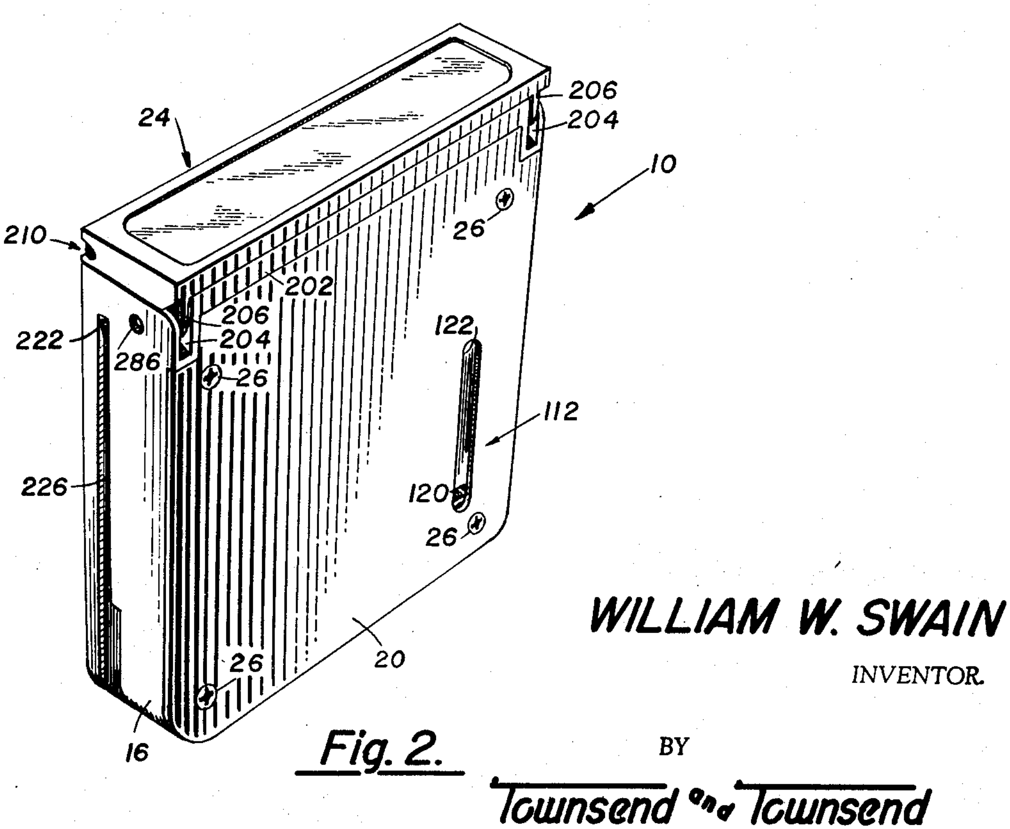
FIG. 2 is a perspective view of the cartridge looking at the rear thereof, the top closure being in a closed position.
Figure 3A:
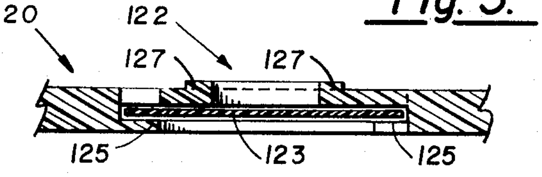
FIGS. 3a is a cross-sectional view taken along line 3*a*—3*a* of FIG. 3.

Arm 112 has an arcuate extension 120 at the opposite end thereof which extends across a vertical slot 122 formed in back wall 20 (FIGS. 2 and 3). The configuration of extension 120 is such that, regardless of the diameter of the tape pack on the supply reel, the portion of extension 120 visible through slot 122 will be substantially horizontal. A transparent window can be mounted in any suitable manner across slot 122. For purposes of illustration, the window (FIG. 3*a*) can be formed from a flexible, plastic strip 123 and inserted between a number of spaced inner and outer wall extensions 125 and 127, respectively, on opposite sides and at the opposite ends of slit 122. Wall extensions 125 are coplanar with each other as are wall extensions 127, wall extensions 125 being generally parallel with wall extensions 127. The plane of the outer surface of each inner wall extension 125 is spaced inwardly from the plane of the inner surface of each outer wall extension 127 to present a space therebetween for the insertion of strip 123. Wall extensions 125 and 127 are preferably formed from a Kiss-Coring molding process; thus inner wall extensions 125 do not laterally overlap outer wall extension 127 when viewing wall 20 from its inner or outer surface. Rear wall 20 can be molded with these wall extensions in a one-step molding procedure. Strip 123, because it is flexible, can be easily inserted in and taken out of the space between adjacent wall extensions 125 and 127 and, when it is in such space, the strip closes slot 122 and prevents dust and dirt from entering housing 12. Slot segments shown in FIG. 3 at the sides and ends of slot 122 indicate the presence of wall extensions 125 and 127.

A scale can be secured to the outer surface of rear wall 20 on one side of slot 122 and the scale can be calibrated in terms of minutes of tape playing time remaining or having elapsed and extension 120 will be alignable with this scale for substantially all tape pack diameters on supply reel 30.

Figure 1:
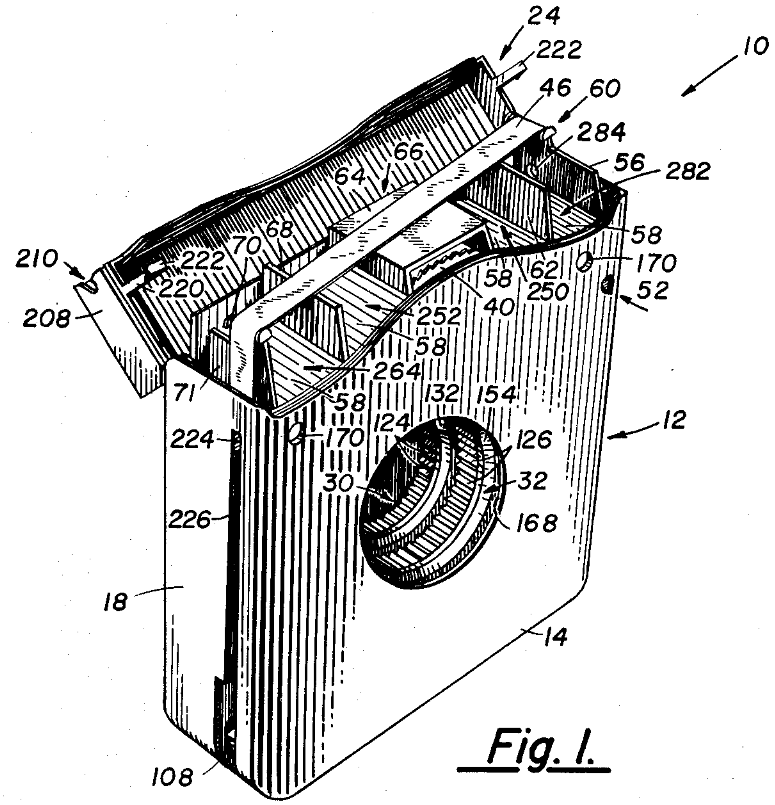
FIG. 1 is a perspective view of the cartridge of this invention with the top closure opened to illustrate details of construction, the view looking toward the front wall of the cartridge.

Reels 30 and 32 are adapted to be releasably coupled to some suitable structure for rotation at the proper time so that tape can move off supply reel 30 and onto take-up reel 32 during a record or playback operation, and tape can move off take-up reel 32 and onto supply reel 30 during a rewind operation. One form of structure suitable for this purpose is the spindle apparatus and inner peripheral means on each of the reel hubs as shown in FIGS. 6 and 7, such spindle apparatus and inner peripheral means forming no part of the present invention. To this end, hubs 34 and 38 have central openings therethrough of different inner diameters, the openings defining inner peripheries for respective hubs and adapted to accommodate spindles of different sizes. Each of the hubs has a plurality of spaced teeth on its inner periphery as shown in FIG. 1, hub 34 having teeth 124 and hub 38 having teeth 126, each tooth being defined by a pair of relatively convergent sides which extend axially of the corresponding hub. Teeth 124 on hub 34 are located on one side of an annular boss 128 (FIG. 6) which has first and second bevelled, annular side surfaces 130 and 132.

Boss 128 serves to releasably interconnect hub 34 and a spindle 134 having a number of spaced detents 136 on the outer periphery thereof (FIG. 7). Detents 136 are cylindrical and are disposed within respective recesses 138 extending inwardly of the outer periphery of spindle 134. Each detent is biased by a coil spring 140 in a direction such that an end portion 142 of the detent extends outwardly beyond the outer periphery of the spindle. End portion 142 of each detent 136 is adapted to be disposed between a pair of adjacent teeth 124 (FIG. 7) so that hub 34 is coupled with spindle 134 for rotation therewith. Surface 132 depresses detents 136 against the bias forces of respective springs 140 as hub 34 is moved onto spindle 134 until detents 136 pass boss 128 thereupon, surface 130 allows the detents to spring outwardly once again, and in so doing, the detents literally force hub 34 onto spindle 134 due to the sliding action of end portions 142 of the detents along surface 130 toward teeth 124. End portions 142 then move into the spaces between adjacent teeth and the flat end face of the hub moves into engagement with the flat face 146 of a flange 144 on spindle 134. Thus, the hub is firmly and releasably attached to the spindle and cannot move axially thereof or cannot rotate with respect thereto until the hub has been backed off the spindle, such as by moving the cartridge housing away from the spindle.

Hub 38 has substantially the same construction as hub 34 except that its inner periphery has a larger inner diameter to accommodate a spindle 148 of a diameter greater than that of spindle 134. Hub 38 has an annular, inner peripheral boss 150 provided with first and second bevelled, annular side surfaces 152 and 154 and is adapted to be removably secured to spindle 148 having a number of detents 156 which are substantially identical with and are for the same purpose as spindle 134. Thus, when hub 38 is on spindle 148, detents 156 engage surface 152 between adjacent teeth 126 to force the flat end face of the hub against the flat face 160 of a flange 158 on the spindle. Hubs 34 and 38 move together onto respective spindles and are held apart from each other by the spindles so that there is no interference between the reels as the rotate within housing 12.

Spindle 134 includes a shaft 162 which extends through and is rotatable relative to a tubular shaft 164 forming a part of spindle 148. A bearing 166 carried by spindle 148 supports the proximal end of shaft 162. Shaft 164 is supported by bearings (not shown) which are parts of the tape transport which includes the spindles.

Front wall 14 has a central opening 168 aligned with hubs 34 and 38 for receiving spindles 134 and 148. This opening can be provided with a closure if desired to keep out dirt and other foreign matter. The closure can be automatically opened when the cartridge is inserted in its operative position in a carriage mechanism which advances the cartridge onto the spindles.

Front wall 14 is provided with a pair of spaced holes 170 therethrough (FIG. 1) for receiving respective alignment or guide pins carried by the base plate of the tape transport with which cartridge 10 is associated. One of these holes is elongated or elliptical as shown in FIG. 3 to provide for tolerances. For purposes of illustration, a guide pin 172 suitable for use in holes 170 is illustrated in FIGS. 9 and 9a and has a cylindrical portion 174 which is rigidly secured in any suitable manner to the base plate 176 of the tape transport. The opposite end of the pin has a conical portion 178 which is receivable within a corresponding hole 170 in wall 14. These guide pins are also received in holes through a pair of walls 180 and 182 between wall 14 and base plate 176, walls 180 and 182 forming parts of the carriage mechanism which advances the cartridge into an operative position near the base plate.

Front wall 14 may also be provided with a knock-out tab 186 to indicate whether or not the tape has been prerecorded. To this end, front wall 14 may be provided with an arcuate slot 184 (FIG. 3) which defines tab 186 and the tab can be knocked out or removed from wall 14 by a suitable tool. When the tab is removed, the resulting hole can receive a shiftable pin 188 projecting outwardly from base plate 176 and movable relative thereto. The pin will abut tab 186 if the latter remains on front wall 14, as shown in FIG. 9, so that the pin will be shifted to the right when viewing FIG. 9 to close a normally open switch 190 forming a part of a circuit adapted to enable a recording circuit. Pin 188 is biased to the left in FIG. 8 in any suitable manner, such as by a coil spring 192 disposed within a tubular housing 194 secured to the proximal face of base plate 176. Walls 180 and 182 of the carriage mechanism are also provided with openings through which pin 188 can extend.

If the tape is prerecorded, tab 186 is removed so that the pin will be received within the corresponding opening as shown in dashed lines in FIG. 9 to thereby prevent movement of the pin to the right. Thus, switch 190 remains open and the recording circuit cannot be enabled.

Top 24 is pivotally secured by a pair of pins 200 to the upper, rear extremities of sidewalls 16 and 18. The inner ends of pins 200 are anchored in a suitable web 202 (FIG. 2), there being a slot 204 underlying each pin 200, respectively, to allow the hinge part 206 on top 24 which receives the adjacent pin to move downwardly without binding as top 24 is opened.

The top has a pair of opposed side faces 208, each side face being provided with a pin-receiving notch or groove 210 extending downwardly and rearwardly from the front face of the top as shown in FIG. 6. To this end, each groove 210 has an upper, inclined surface 212, an inner end surface 214, and a pair of relatively convergent, lower inclined surfaces 216 and 218. The purpose of grooves 210 is to receive laterally extending pins 236 on respective arms 234 pivotally mounted on and projecting outwardly from base plate 176 (FIGS. 8 and 8*c*).

The top is opened by the pins 236 on arms 234 when housing 12 is moved toward base plate 176. To this end, the pins on the arms are received within grooves 210 and force the top rearwardly and about pins 200 since the axes of the latter are below the inner end of groove 210. The top is then pivoted to the open position of FIG. 6, thus exposing tape stretch 46 while, at the same time, reels 30 and 32 are coupled with respective spindles 134 and 148.

Latch means is provided for releasably locking top 24 to housing 12 so long as the cartridge is out of an operative position with respect to the carriage mechanism. To this end, each side of top 24 is provided with a resilient leg 220 (FIGS. 1 and 6) which depends from top 24 and has a wedge-shaped latch member 222 as shown in FIGS. 1, 8a and 8b. Each latch member 222 normally projects into an opening 224 extending through the adjacent sidewall opening 224 communicating with a groove 226 in the outer surface of the adjacent sidewall. Grooves 226 in sidewalls 16 and 18 are adjacent to front wall 14 so as to be asymmetrically located between front and back walls 14 and 20. Also, each groove 226 has a step intermediate its ends so that its lower portion is wider than its upper portion. Also opening 110 (FIG. 3) for brake unit 90 communicates with groove 226 of sidewall 18.

The wedge shape of the latch members causes the latter to latch under the shoulder 228 defining the upper extremity of opening 224 so that the top cannot normally be opened to expose tape stretch 46. However, if the latch members are forced inwardly, such as by a spline 230 on the carriage mechanism 232 which moves the cartridge toward the base plate, the latch member is moved inwardly of shoulder 228 and permits opening of top 24. Spline 230 moves in and is guided by groove 226 as cartridge 10 is inserted in mechanism 232. The carriage mechanism can then advance the cartridge toward base plate 176 so that a pair of the aforementioned arms 234 will operate to open top 24 in the manner shown in FIGS. 8 and 9 as the cartridge is moved toward base plate 176.

Each arm 234 is preferably of the shape shown in FIG. 8*c* and extends through an adjacent opening in base plate 176 and is pivotally carried on a support 239 by a pin 238. A coil spring 240 on pin 238 engages the arm and biases it in a counterclockwise sense when viewing FIG. 8. A stop 242 rigid to arm 234 near pin 238 engages the adjacent side of the base plate 176 and limits the counterclockwise travel of the arm. Since pins 236 and the groove 210 are above pivot pin 200, arm 234 will open top 24 as the cartridge is advanced by carriage mechanism 232 toward base plate 176.

Cartridge 10 is of the type which is adapted to be used with a rotary head assembly on a tape transport wherein tape stretch 46 is pulled outwardly of the cartridge and disposed partially about a rotary scanner of the type having a number of spaced heads rotatable about a central axis, the heads being angularly spaced apart and in generally parallel planes to permit the tape transport and the cartridge to utilize the advantages of the skip-field principle by means of which selected video fields of a video image are recorded on the tape by one of the heads. In a playback mode, all of the heads scan the same track for each revolution of the scanner so that the recorded information is played back a number of times at a rate above the flicker rate of the human eye to present a picture of acceptable quality.

The normal operative position of cartridge 10 is below a rotary head assembly of a tape transport. The cartridge is adapted to cooperate with a pair of shiftable tape pick-up elements or guides shown schematically in dashed lines in FIG. 3, the guides operating to pull the tape away from the cartridge and about a portion of the arcuate path of the head of the rotary head assembly. Housing 12 has a pair of recesses 250 and 252 for receiving guides 254 and 256 mounted on the tape transport for movement toward and away from housing 12, such as along respective paths 258 and 260. Recess 250 is disposed between web segment 62 and hollow extension 66; whereas, recess 252 is disposed between web segment 68 and extension 66 (FIG. 1).

Guides 254 and 256 are received within recesses 250 and 252 as the cartridge moves toward the base plate. A pinch roller 262 shiftably carried by base plate 176 is received within a recess 264 (FIGS. 1 and 9*a*) between web segments by a slot 263 toward a rotatable tape drive capstan 266 extending outwardly from the tape transport base plate (FIG. 3). The pinch roller 262 operates to force the tape into engagement with the capstan so that the latter will drive the tape toward take-up reel 32. Linkage structure (not shown) coupled with guides 254 and 256 and pinch roller 262 is provided to move these elements away from the cartridge to pull the tape out of the cartridge, about the assembly and against capstan 266.

OPERATION

Cartridge 10 is assembled with reels 30 and 32 therein and with tape 44 coupled to the hubs of the reels and wrapped thereon to form tape packs. Initially, the maximum amount of tape will be on the supply reel 30 in the manner shown in FIG. 4 and the tape will extend along the path shown in FIG. 3 between the reels. Thus, tape stretch 46 will be in the position shown in FIG. 1 in spanning relationship to the guides 60 and 70 while being supported by the various web segments 56, 62, 68 and 71 and extension 66.

Top 24 will be normally closed and the latch-defining tips 222 on resilient legs 220 will extend into openings 224 (FIG. 8a) so that top 24 will be releasably locked in place to housing 12 to protect tape stretch 46. Also, tape indicator arm 112 will be in the full line position of FIG. 3 to indicate maximum playing time on the tape by virtue of the extension 120 projecting across the lower end of slot 122.

Brake 90 will be in the dashed line position shown in FIG. 3 wherein extensions 92 and 94 will have their ends in engagement with respective teeth 96 on flanges 36 and 40 of reels 30 and 32. Thus, the reels will be held against movement within the housing.

Tab 186 will remain on front wall 14 if it is desired to record on the tape. Otherwise, the tab will be removed to indicate that the tape has been prerecorded.

The carriage mechanism 232 is initially tilted as shown in FIG. 8 so as to facilitate the insertion of the cartridge 10 into the carriage mechanism. Cartridge 10 is then inserted into carriage mechanism 232 whereupon guide bar means on the mechanism forces projection 108 of brake 90 inwardly to cause spring 104 to flex thereby allowing extensions 92 and 94 to move out of engagement with the teeth on the flanges of the tape reels. Also, spline 230 on carriage mechanism 232 received in side grooves 226 will force tips 222 inwardly (FIG. 8*b*) and thereby permit top 24 to be opened.

The cartridge is then advanced toward base plate 176 and onto the spindles thereof by carriage mechanism 232. Firstly, the carriage mechanism is moved into a vertical position from the tilted position of FIG. 8 so that pins 236 on arms 234 are received within grooves 210 at the sides of top 24. Pins 236, therefore, form abutments against which top 24 engages and by means of which top 24 is opened as arms 234 pivot upwardly in a clockwise direction when viewing FIGS. 8 and 9. Thus, tape stretch 46 becomes exposed and can be pulled out of the cartridge. Also, as the cartridge advances toward the base plate 176, the following actions occur: guides 254 and 256 and pinch roller 262 are received within recesses 250, 252 and 264, respectively (FIG. 3); guide pins 172 (FIGS. 9 and 9a) are received within respective holes 170 to properly position cartridge housing 12 for the efficient movement of reel hubs 34 and 38 onto respective spindles 134 and 138. The mechanism for moving guides 254 and 256 and pinch roller 262 can then be actuated to pull tape stretch 46 out of the cartridge and about the scanner assembly which includes the head which scan the tape along oblique tracks thereon. Movement of the pinch roller 262 from the cartridge 10 is illustrated by the dashed lines of FIG. 9*a*.

Capstan 266 (FIG. 3) is rotated to advance the tape from the supply reel to the take-up reel during a record or playback operation. Take-up reel 32 is rotated in a clockwise sense (FIG. 3) to cause the tape to be wrapped thereon. When this occurs, supply reel 30 freely rotates in a counter clockwise sense. As the tape moves off the latter reel, indicator arm 112, viewable through slot 122, continues to engage the tape pack on the supply reel to indicate the remaining playing time or the elapsed playing time as this tape pack decreases in diameter.

To sense the end of the tape play, a photocell device 280, extending outwardly from base plate 176 (FIG. 9) extends into a recess 282 defined by web segments 56 and 62 (FIG. 3). The photocell is aligned with an opening 284 in web segment 56 and opening 286 in the adjacent sidewall 16 so that a light source 288 carried by the base plate can direct a light beam toward the photocell. When the transparent leader at the end of the tape connected to hub 34 passes between the photocell and the light source at the end of a record or playback operation, a signal is generated in the photocell and such signal can be used to cause automatic operation of a number of elements, such as the mechanism, which effects the return of tape guides 254 and 256 and pinch roller 262 to their initial positions shown in FIG. 3. Thus, the tape can be returned to the cartridge from the rotary head as assembly and a rewind operation can then be commenced.

For rewinding the tape, the tape stretch 46 must be in the position shown in FIG. 3. Suitable means can be provided to assure that there will be no rewind of the tape until this condition is satisfied. Thereupon, supply reel 30 is rotated in a clockwise sense to wind tape thereon, take-up reel rotating freely in a counterclockwise sense during the rewind operation.

During a rewind operation, photocell 280 will sense the presence of the transparent leader secured to hub 38 so as to generate a signal which be used to stop the rewind operation. Also, during rewind, the tape pack diameter on hub 34 will progressively increase to, in turn, cause indicator arm 112 to move downwardly past slot 122 and in a clockwise sense when viewing FIG. 3. At the end of the rewind operation, extension 120 of arm 112 will again indicate the maximum play condition of the tape wherein extension 120 will be adjacent to the bottom of slot 122.

After a rewind operation, the carriage mechanism can be moved away from base plate 176 so that the cartridge can be separated therefrom. When this occurs, top 24 is moved into its closed position since pins 236 on arms 234 remain in grooves 210 during the movement of mechanism 232 away from the base plate. When the cartridge is in the vertical full line position of FIG. 8, it can be moved further away from arms 234 and out of coupled relationship to pins 236. For instance, the carriage mechanism 232 can be tilted with respect to the base plate to allow access to the cartridge (FIG. 10).

As the cartridge 10 is removed from the carriage mechanism 232, splines 230 move out of engagement with latch-defining tips 222 on legs 220 of top 24. This allows the tips to move back into openings 224 (FIGS. 8a and 8b) to releasably lock the top to housing 12. Also, projection 108 on brake 90 (FIG. 3) moves out of engagement with the means which forces it inwardly of housing 12, whereupon, extensions 92 and 94 return to their dashed line positions of FIG. 3 under the influence of spring 104. The extensions then engage the teeth on respective reel flanges to releasably lock the reels against movement within the cartridge housing.

Grooves 226 extend to bottom wall 22 and are open at their lower ends to receive respective guide bars on the adjacent inner surfaces of carriage mechanism 232 as the cartridge is inserted thereinto. Also, projection 108 of brake unit 90 normally extends outwardly of the inner surface of the corresponding groove 226 so that the guide bar which is received within the groove forces projection 108 inwardly to release the brake unit from coupled relationship to the reel flanges.

While the cartridge of the present invention has been described as being usable with a tape transport having a rotary head assembly, it is possible that the cartridge could be used with other head assemblies, such as an assembly having a fixed head. Also, the cartridge can be used for the handling of digital or audio information as well as video information.

Subject matter disclosed, but not claimed herein, is claimed in various ones of the following copending U.S. Pat. Applications, assigned to the same assignee as the present Application and filed on the same day, June 26, 1970: as to the apparatus generally, including the bucket, Patent application Ser. No. 50,059, Richard A. Hathaway, entitled "Tape Transport Apparatus;" as to the shiftable tape pick-up elements, Patent Application Serial No. 50,245, William W. Swain,and Richard A. Hathaway, entitled "Drive for Tape Guides of Tape Transport;" as to the spindles, Patent Application Ser. No. 50,204, Richard A. Hathaway, entitled "Spindle Construction for Tape Transport."

I claim:

1. A video cartridge for use with apparatus of the type having rotatably mounted transducers, comprising:

a housing having an open extremity and a pair of axially aligned tape reels therein, the reels adapted to be coupled to a flexible, magnetic tape and disposed to permit a stretch of the tape to extend between the reels;

spaced fixed guide means adjacent to said open extremity for supporting said tape stretch in a position, inclined relative to the housing, from which it can be pulled out of the housing and away from said extremity and into helical scanning relationship to the transducers, the fixed guide means and housing being formed for receiving shiftable tape guides, whereby said tape stretch can be pulled out of said housing by the shiftable guides;

and means swingably mounted on the housing for closing said open extremity.

2. A tape cartridge comprising:

a housing having a front wall, a back wall, a pair of opposed sidewalls, and an open extremity adjacent to the upper portions of said walls;

a pair of tape reels floatingly mounted within the housing and being generally axially aligned with each other, each reel having a hub, said front having an opening aligned with the hubs, the reels adapted to be coupled to a flexible, magnetic tape with a stretch of the tape extending between the reels and along said open extremity and said tape being in wrapped relationship on the hubs;

a pair of spaced tape guides carried by the housing adjacent to said open extremity and disposed for supporting said tape stretch in a position from which it can be pulled out of the housing;

means on the housing for defining a pair of recesses for receiving a pair of shiftable tape guides which are movable in a direction to permit the tape stretch to be pulled out of the housing;

a top for covering said open extremity;

means pivotally mounting the top on the housing for movement into and out of a location closing the open extremity to thereby cover the tape stretch adjacent thereto, one of the sidewalls of the housing having an opening therethrough;

a latch member; and resilient means mounting the latch member on the top, said latch member being received within said sidewall opening from within said housing when said top is in said location, whereby the top is releasably attached to the housing, said latch member being movable into said housing and out of said sidewall opening to release the top for pivotal movement relative to the housing, said top having an inclined groove formed therein at the side thereof for receiving a pin to cause the top to pivot out of said location as the housing is moved relative to a tape transport and when the latch means is released.

3. A tape cartridge as set forth in claim 2, wherein said one sidewall is provided with a second opening therethrough, and wherein is included a brake shiftably mounted within said housing near said one sidewall and disposed to engage said reels to releasably hold the same against movement within the housing, said brake being biased into engagement with said reels and having an actuator extending into said second opening, said actuator being movable inwardly of the housing to move the brake out of engagement with said reels.

4. A tape cartridge as set forth in claim 3, wherein said one sidewall has a vertical groove in the outer surface thereof, said openings communicating with said vertical groove.

5. A tape cartridge as set forth in claim 3, wherein said brake includes a pair of generally parallel extensions, means rotatably mounting the extensions on the housing for movement about an axis substantially parallel with the axis of each reel, means biasing the extensions toward said reels, each of the reels having a flange provided with a number of teeth on its outer periphery, said extensions being disposed to engage respective flanges between adjacent teeth thereon, said actuator being secured to the mounting means for the extensions and disposed to rotate the extensions away from the reel flanges as the actuator moves inwardly of the housing.

6. A tape cartridge as set forth in claim 2, wherein said back wall has a vertical slot therein, and wherein is included means within said housing and viewable through said slot for providing an indication of the amount of tape wrapped on one of said reels.

7. A video cartridge for use with apparatus of the type having rotatably mounted transducers, comprising:

a housing having side walls formed with individually aligned longitudinal grooves and having an open extremity and a pair of axially aligned tape reels therein, the reels adapted to be coupled to a flexible, magnetic tape and disposed to permit a stretch of the tape to extend between the reels;

spaced guide means adjacent to said open extremity for supporting said tape stretch in a position, inclined relative to the housing, from which it can be pulled out of the housing and into helical scanning relation to the transducers, the spaced guide means and housing being formed for receiving shiftable tape guides, whereby said tape stretch can be pulled out of the housing by the shiftable guides;

means swingably mounted on the housing for removably closing said open extremity;

brake means within the housing for releasably holding the reels against rotation relative to the housing;

and means comprising a lever, projecting into and protected by one of said grooves, for releasing the brake means as the housing is placed into operating position, said lever being adapted to be depressed as said grooves register with said apparatus.

8. A tape cartridge comprising:

a housing having an open extremity;

a pair of tape reels in said housing, the reels being adapted to be coupled to a flexible, magnetic tape and disposed to permit a stretch of said tape to extend between the reels;

a pair of tape guides carried by said housing adjacent to said open extremity and disposed for supporting said tape stretch in a position from which it can be pulled outwardly of the extremity and away from the housing;

a closure for said open extremity;

means pivotally mounting the closure on the housing for movement into and out of a location closing the open extremity;

a latch member for releasably securing the closure to the housing when the closure is in said location; and resilient means mounting the latch member on said closure, said housing having an opening therethrough for receiving the latch member when the closure is in said location, said housing further having a sidewall provided with an elongated groove in the outer surface thereof, said opening extending through said one sidewall and communicating with said groove, the groove being adapted to receive a device on a tape transport for urging the latch member inwardly of the housing, said closure having means thereof for effecting the movement of the closure out of said location as the housing moves relative to the tape transport.

9. A tape cartridge comprising:

a housing having an open extremity, a pair of tape reels therein, the reels adapted to be coupled to a flexible, magnetic tape and disposed to permit a stretch of said tape to extend between the reels;

a pair of tape guides carried by said housing adjacent to said open extremity and disposed for supporting said tape stretch in a position from which it can be pulled outwardly of the extremity and away from the housing;

a closure for said open extremity;

means pivotally mounting the closure on the housing for movement into and out of a location closing the open extremity;

and securing means comprising a pair of resilient legs secured to and extending outwardly from the opposed sides of the closure for releasably securing the closure to the housing when the closure is in said location, each leg having a latch member at its outer end thereof, the opposed sides of the housing having a pair of openings therethrough for receiving respective latch members, the latch members being movable inwardly of the opening when the housing is moved into an operative position on a tape transport to thereby cause the latch members to clear the housing sides and permit the closure to be opened, said closure having means thereon for effecting the movement of the closure out of said location as the housing moves relative to said tape transport.

10. A tape cartridge comprising:

a housing having an open extremity, a pair of tape reels therein, the reels adapted to be coupled to a flexible, magnetic tape and disposed to permit a stretch of said tape to extend between the reels;

a pair of tape guides carried by said housing adjacent to said open extremity and disposed for supporting said tape stretch in a position from which it can be pulled outwardly of the extremity and away from the housing;

a closure for said open extremity;

means pivotally mounting the closure on the housing for movement into and out of a location closing the open extremity;

and means coupled with the closure for releasably securing the same to the housing when the closure is in said location, said closure having a side provided with a groove in its outer surface for receiving a pin comprised in a tape transport, said side with said groove defining means for effecting the movement of the closure out of said location as the housing moves relative to a tape transport.

11. A tape cartridge comprising:

a housing having an open extremity, a pair of tape reels therein, the reels adapted to be coupled to a flexible, magnetic tape and disposed to permit a stretch of said tape to extend between the reels;

a pair of tape guides carried by said housing adjacent to said open extremity and disposed for supporting said tape stretch in a position from which it can be pulled outwardly of the extremity and away from the housing;

a closure for said open extremity, said closure having a front, a top and a pair of opposed sides, means adjacent to the rear ends of said sides for pivotally mounting the closure on the housing for movement into and out of a location closing the open extremity; and means coupled with the closure for releasably securing the same to the housing when the closure is in said location, said closure having formations thereon for effecting the movement of the closure out of said location as the housing moves relative to the tape transport, said formations comprising individual grooves in the outer surface of each side, each groove being inclined and extending from said front in a direction away from said top with respect to said housing to permit a pin received within the groove to rotate at the inner end of the groove relative to the closure when the latter pivots with respect to said housing.

12. A tape cartridge comprising:

a housing having an open extremity;

a pair of tape reels therein, the reels adapted to be coupled to a flexible, magnetic tape and disposed to permit a stretch of said tape to extend between the reels;

a pair of tape guides carried by said housing adjacent to said open extremity and disposed for supporting said tape stretch in a position from which it can be pulled outwardly of the extremity and away from the housing, said housing having means defining a pair of recesses adjacent to said open extremity for receiving a pair of shiftable tape guides adapted to pull the tape stretch out of and away from said housing, a closure for said open extremity;

means pivotally mounting the closure on the housing for movement into and out of a location closing the open extremity;

and means coupled with the closure for releasably securing the same to the housing when the closure is in said location, said closure having means thereon for effecting the movement of the closure out of said location as the housing moves relative to the tape transport.

13. A tape cartridge as set forth in claim 12, wherein said housing has a web extending along said extremity, said web having a number of spaced, transverse web segments extending outwardly therefrom and constituting the means for defining a pair of recesses for receiving a pair of shiftable tape guides adapted to pull the tape out of and away from said housing.

14. A tape cartridge comprising:

a housing having an extremity;

a pair of tape reels therein, the reels adapted to be coupled to a flexible, magnetic tape and disposed to permit a stretch of said tape to extend between the reels;

a pair of tape guides carried by said housing adjacent to said open extremity and disposed for supporting said tape stretch in a position from which it can be pulled outwardly of the extremity and away from the housing;

a closure for said open extremity;

means pivotally mounting the closure on the housing for movement into and out of a location closing the open extremity;

means coupled with the closure for releasably securing the same to the housing when the closure is in said location;

said closure having means thereon for effecting the movement of the closure out of said location as the housing moves relative to the tape transport; and a brake shiftably carried by the housing and coupled with said reels for releasably holding the same against movement within the housing, said brake having means extending through the housing and movable relative thereto to cause the brake to be shifted out of coupled relationship to the reels when the housing is moved into an operative position with respect to a tape transport.

15. A tape cartridge comprising:

A housing having an open extremity;

a pair of tape reels therein, the reels adapted to be coupled to a flexible, magnetic tape and disposed to permit a stretch of said tape to extend between the reels;

a pair of tape guides carried by said housing adjacent to said open extremity and disposed for supporting said tape stretch in a position from which it can be pulled outwardly of the extremity and away from the housing;

a closure for said open extremity;

means pivotally mounting the closure on the housing for movement into and out of a location closing the open extremity; and means coupled with the closure for releasably securing the same to the housing when the closure is in said location, said closure having means thereon for effecting the movement of the closure out of said location as the housing moves relative to the tape transport, said housing having a pair of opposed sides, each side having an elongated groove extending therein throughout a major portion of the length of the side for guiding the cartridge as the latter is inserted into an operative position with respect to a tape transport.

16. A tape cartridge as set forth in claim 15, wherein each of the sides of the housing has a pair of opposed longitudinal edges, the groove in each side being closer to one longitudinal edge thereof than to the other longitudinal edge, whereby the groove is asymmetrically located between said longitudinal edges.

17. A tape cartridge comprising:

A housing having an open extremity;

a pair of tape reels therein, the reels adapted to be coupled to a flexible, magnetic tape and disposed to permit a stretch of said tape to extend between the reels;

a pair of tape guides carried by said housing adjacent to said open extremity and disposed for supporting said tape stretch in a position from which it can be pulled outwardly of the extremity and away from the housing;
a closure for said open extremity;
means pivotally mounting the closure on the housing for movement into and out of a location closing the open extremity;
and means coupled with the closure for releasably securing the same to the housing when the closure in in said location,
said closure having means thereon for effecting the movement of the closure out of said location as the housing moves relative to the tape transport,
said housing having a wall disposed in a plane substantially parallel with planes of rotation of the reels,
said wall having an opening therethrough, said reels having respective hubs generally aligned with the opening.

18. A tape cartridge comprising:
A housing having an open extremity;
a pair of tape reels therein, the reels adapted to be coupled to a flexible, magnetic tape and disposed to permit a stretch of said tape to extend between the reels;
a pair of tape guides carried by said housing adjacent to said open extremity and disposed for supporting said tape stretch in a position from which it can be pulled outwardly of the extremity and away from the housing;
a closure for said open extremity;
means pivotally mounting the closure on the housing for movement into and out of a location closing the open extremity;
means coupled with the closure for releasably securing the same to the housing when the closure is in said location, said closure having means thereon for effecting the movement of the closure out of said location as the housing moves relative to the tape transport; and
means on said housing for providing a visual indication of the amount of tape on one of said reels.

19. A tape cartridge as set forth in claim 18 wherein said housing has a wall provided with a slot therethrough,
said providing means including a swingable arm, viewable through the slot,
said wall having a number of spaced wall extensions on opposed sides of said slot and defining a space on each side of the slot, respectively, and
a transparent strip receivable within said space to define a window for said slot.

20. A tape cartridge comprising:
A housing;
a pair of tape reels therein with the reels being generally axially aligned with each other, each reel having a flange with a plurality of teeth on the outer periphery thereof;
and a brake shiftably mounted within the housing and engageable with the flanges to hold the reels against substantial movement within the housing, said brake having extensions projecting through the housing for releasing the same when the housing is in an operative position with respect to a tape transport,
said extensions having respective outer ends engageable between adjacent teeth of corresponding flanges and including a sleeve secured to said extensions and disposed transversely thereof;
the sleeve being pivotally mounted within the housing for movement about said axis, and
spring means coupled with said sleeve and engaging said housing for biasing the extensions into engagement with respective reel flanges,
said moving means including an actuator arm rigidly secured to and extending laterally from said sleeve,
said housing having an opening therethrough adjacent to said brake,
said actuator arm having a portion extending through said opening.

21. A tape cartridge comprising:
A housing having a pair of tape reels therein with the reels being generally axially aligned with each other, each reel having a flange;
and a brake shiftably mounted within the housing and engageable with the flanges to hold the reels against substantial movement within the housing,
said brake being of a one-piece construction and formed from a moldable material and having means extending through the housing for releasing the same when the housing is in an operative position with respect to a tape transport.

22. A tape cartridge comprising:
A housing having an open extremity;
a pair of axially aligned tape reels therein, the reels having flanges and being adapted to be coupled to a flexible, magnetic tape and disposed to permit a stretch of the tape to extend between the reels;
means adjacent to said open extremity for supporting said tape stretch in a position from which it can be pulled out of the housing, there being a recess adjacent to said supporting means for receiving a shiftable tape guide, whereby said tape stretch can be pulled out of the housing by the guide;
means shiftably mounted on the housing for removably closing said open extremity;
means within the housing for releabably holding the reels against rotation relative to the housing; and
means within the housing for indicating the amount of tape on one of the reels, said holding means including
a brake pivotally mounted within the housing and engageable with the outer periphery of each flange, respectively,
means biasing the brake engagement with the flanges, and
means responsive to the insertion of the housing into an operative position for moving the brake away from the reel flanges.

23. A video cartridge for use with video recording and/or reproducing apparatus, said apparatus having a plane of orientation and comprising rotatably mounted multiple transducers, said cartridge comprising:
a rigid housing,
a tape supply reel and a tape pick-up reel coaxially rotatably supported in superposed relation in said housing, said reels being adapted to have a flexible magnetic tape distributively wound thereon,
first and second spaced tape guides mounted in said housing to poise an inclined span of said magnetic tape, said housing and tape guides being formed to provide for the reception of tape pick-up elements behind said tape span as the housing approaches the apparatus in parallelism to said plane, whereby the span can be withdrawn for helical scanning and at an angle relative to the paths of the transducers.

24. A video cartridge for use with video recording and/or reproducing apparatus, said apparatus having a plane of orientation and comprising rotatably mounted multiple transducers, said cartridge comprising;
a rigid housing having sides formed with longitudinal grooves adapted to interfit with said apparatus,
a tape supply reel and a tape pick-up reel coaxially rotatably supported in superposed relation in said housing, said reels being adapted to have a flexible magnetic tape distributively wound thereon,
first and second spaced tape guides mounted in said housing to poise an inclined span of said magnetic tape, said housing and tape guides being formed to provide for the reception of tape pick-up elements behind said tape span as the housing approaches the apparatus in parallelism to said plane, whereby the span can be withdrawn for helical scanning and at an angle relative to the paths of the transducers.

25. A video cartridge for use with video recording and/or reproducing apparatus, said apparatus having a plane of orientation and comprising rotatably mounted multiple transducers, said cartridge comprising:

a rigid housing having a frontal face formed with alignment apertures adapted to register with said apparatus, a tape supply reel and a tape pick-up reel coaxially rotatably supported in superposed relation in said housing, said reels being adapted to have a flexible magnetic tape distributively wound thereon, first and second spaced tape guides mounted in said housing to poise an inclined span of said magnetic tape, said housing and tape guides being formed to provide for the reception of tape pick-up elements behind said tape span as the housing approaches the apparatus in parallelism to said plane, whereby the span can be withdrawn for helical scanning and at an angle relative to the paths of the transducers.

26. A video cartridge for use with video recording and/or reproducing apparatus, said apparatus having a plane of orientation and comprising rotatably mounted multiple transducers, said cartridge comprising:

a rigid housing having sides and a frontal face, said sides being formed with longitudinal grooves adapted to interfit with said apparatus, said frontal face being formed with apertures adapted to register with said apparatus, a tape supply reel and a tape pick-up reel coaxially rotatably supported in superposed relation in said housing, said reels being adapted to have a flexible magnetic tape distributively wound thereon, first and second spaced tape guides mounted in said housing to poise an inclined span of said magnetic tape, said housing and tape guides being formed to provide for the reception of tape pick-up elements behind said tape span as the housing approaches the apparatus in parallelism to said plane, whereby the span can be withdrawn for helical scanning and at an angle relative to the paths of the transducers.

27. A video cartridge for use with video recording and/or reproducing apparatus, said apparatus having a plane of orientation and comprising rotatably mounted multiple transducers and drive means, said cartridge comprising:

a rigid housing having sides and a frontal face, said sides being formed with longitudinal grooves adapted to interfit with said apparatus, said frontal face being formed with apertures adapted to register with said apparatus, a tape supply reel and a tape pick-up reel coaxially rotatably supported in superposed relation in said housing, said reels being adapted to have a flexible magnetic tape distributively wound thereon, first and second spaced tape guides mounted in said housing to poise an inclined span of said magnetic tape, said housing and tape guides being formed to provide for the reception of tape pick-up elements behind said tape span as the housing approaches the apparatus in parallelism to said plane, whereby the span can be withdrawn for helical scanning and at an angle relative to the paths of the transducers, said reels being formed to receive the drive means during the approach of the housing to the apparatus.

* * * * *